United States Patent [19]

Sano et al.

[11]  4,092,250

[45]  May 30, 1978

[54] FILTERS FOR THE SELECTIVE COLLECTION OF METALLIC IONS

[75] Inventors: Takezo Sano, Takatsuki; Ichiki Murase, Ibaraki, both of Japan; Akira Kobayashi, deceased, late of Ibaraki, Japan; by Shuko Kobayashi, successor; by Tsutomu Kobayashi, guardian, both of Kagoshima, Japan

[73] Assignee: Sumitomo Chemical Company, Limited, Osaka, Japan

[21] Appl. No.: 712,694

[22] Filed: Aug. 9, 1976

[30] Foreign Application Priority Data

Dec. 8, 1975    Japan ................................ 50-98286

[51] Int. Cl.$^2$ ...................... B01D 39/00; B01D 39/14
[52] U.S. Cl. .............................. 210/500 M; 210/501;
210/502; 210/505; 210/508; 260/2.5 AY;
260/2.5 AD; 260/2.5 HA; 260/2.5 HB
[58] Field of Search .................. 210/23 R, 36, 500 R,
210/500 M, 502, 501, 503, 505, 508, 504;
260/2.5 R, 2.5 AY, 2.5 AD, 2.5 H, 2.5 HA, 2.5 HB

[56] References Cited

U.S. PATENT DOCUMENTS

| | | | |
|---|---|---|---|
| 3,252,270 | 5/1966 | Pall et al. ............................ | 210/502 |
| 3,327,859 | 6/1967 | Pall .................................. | 210/500 R |
| 3,728,257 | 4/1973 | Fuxelius ............................ | 210/502 |
| 3,755,161 | 8/1973 | Yokota et al. ...................... | 210/36 |
| 3,807,571 | 4/1974 | Walmsley ......................... | 210/500 M |
| 3,840,634 | 10/1974 | Chiolle ............................. | 210/500 M |
| 3,959,149 | 5/1976 | Oda et al. .......................... | 210/502 |
| 3,979,285 | 9/1976 | Wegmuller et al. ................. | 210/502 |

*Primary Examiner*—Frank W. Lutter
*Assistant Examiner*—Frank Sever
*Attorney, Agent, or Firm*—Stevens, Davis, Miller & Mosher

[57] ABSTRACT

Filters for the selective collection of metallic ions, comprising a water-permeable, thin layer film made from pulp or fiber having the metallic ion collecting groups chemically linked thereto which are made up of a polar group containing an oxygen, nitrogen or sulfur atom which may selectively form a nonionic linkage together with metallic ions.

5 Claims, No Drawings

FILTERS FOR THE SELECTIVE COLLECTION OF METALLIC IONS

The present invention relates to filters for the selective collection of metallic ions.

Recently increasing water pollution has become a social problem so that a waste water standard and an environmental standard have been established from the standpoint of preservation of the environment. These regulations are likely to become more severe in the future. One of the important substances causing water pollution is are heavy metals. In various industries, for example, chemical, mining, iron and steel, electrical and the like industries, which use a large quantity of water, heavy metals are often used in the process and a trace amount of the heavy metals is sometimes contained in the waste water discharged. Consequently, removal and analysis of heavy metals are very important techniques.

Collection of heavy metals in waste water has extensively been studied and some of the studies are now put to practical use. Analysis of heavy metals in waste water has also made an remarkable progress and an atomic absorption analysis is particularly important. However, in order to ensure the selective removal or collection of an extremely small trace amount of heavy metals contained in waste water, many technical and economical problems still remain unsolved.

For the reasons described above, the inventors studied the efficient removal of an extremely small trace amount of heavy metals contained in water, and proposed a novel cation exchange filter paper. However, this filter paper is poor in selectivity and can not remove heavy metals alone from water containing many other metals. Further, the filter paper has not a satisfactory ability to collect a trace amount of heavy metals. Therefore, the inventors have further studied to improve its selectivity.

An object of the present invention is to provide filters which have an ability to collect selectively an extremely small trace amount of the objective heavy metals contained in water and are useful for purification and analysis of water.

The present filters for the selective collection of metallic ions comprise a water-permeable, thin layer film made from pulp or fiber having metallic ion collecting groups chemically linked thereto which are made up of a polar group containing an oxygen, nitrogen or sulfur atom which may selectively form a nonionic linkage together with metallic ions.

The pulp and fiber have a large effective contact area and therefore they collect metallic ions more rapidly than conventional ion-exchange resins and chelating resins. When water is passed through the filters made of the pulp or fiber, most of the objective metallic ions are collected at the upper layer of the filters. Consequently, the pulp or fiber can be used in the form of a thin layer film, in other words, in the form of filter paper, filter cloth or filter plate. Therefore, the analytical equipment becomes simple and analytical operation becomes rapid.

As the pulp or fiber used as starting material in the present invention, there may be used any of natural pulp and fiber (e.g. cellulose pulp, cellulose fiber) and synthetic pulp and fibers. It is desirable for the pulp or fiber to have at least one reactive group selected from the group consisting of hydroxyl, carboxyl, carboxylic ester, amino, and imino groups, a halogen atom and benzene and pyridine nuclei, in order to facilitate the formation of a linkage with metallic ion collecting groups.

Synthetic pulps of polyolefins (e.g. polyethylene, polypropylene) not having these reactive groups may also be used. In this case, it is desirable to introduce the reactive group, for example, a halogen atom, by the well-known methods and then introduce the collecting group. Polyvinyl chloride fiber or pulp is particularly preferred because it has originally a reactive chlorine atom. For the same reason, copolymers of a vinyl halide and an olefin or another vinyl monomer are also desirable for the production of fiber or pulp. Polystyrene pulp or fiber has a reactive benzene nucleus so that introduction of the reactive groups and collecting groups is easy. Polyvinyl alcohol pulp or fiber is also desirable because it has a reactive hydroxyl group. Novolac resin fiber or pulp having a benzene nucleus and a hydroxyl group is also usable. In the introduction of the collecting groups, the above-described pulp or fiber which has a main polymer chain comprising —C—C— linkages is desirable, because such a chain does not cause a substantial reduction in the strength of pulp or fiber owing to the cleavage of the main chain. However, polyamide or polyester fiber may be used in some cases. Diameter of the fiber is preferably less than 50 $\mu$ and particularly preferably less than 20 $\mu$.

Preferred metallic ion collecting groups are ones which are made up of polar groups containing an oxygen, nitrogen or sulfur atom and have the ability of forming a very slightly water-soluble or water-insoluble nonionic linkage together with specific metallic ions. Preferred groups are chelate linkage forming ones such as acetamino, iminodiacetato, o-aminophenol, ethylenediamino, polyethylenepolyamine, thiourea, phenylthiourea, thiosemicarbazide, thiocarbazide, dithiocarbamate, dithiocarbamic acid, resorcinol, gallic acid, dithioic acid, thiol and polythiol groups. Among those, the iminodiacetato and dithiocarbamic acid groups are very useful as they have a high ability to collect metallic ions.

The ability of these groups to collect metallic ions is selective and they can not collect every metallic ion. Consequently, the groups should properly be used depending upon the intended use. The metallic ions collectable are mainly of heavy metals such as copper, silver, gold, zinc, chromium, cadmium, mercury, lead, iron, cobalt, nickel, ruthenium, rhodium, palladium, osmium, iridium, platinum and uranium. In some cases, these collecting groups are effective for collecting titanium, vanadium, manganese, zirconium, molybdenum and tungsten.

The foregoing metallic ion collecting groups are easily introduced into the pulp or fiber having the reactive groups by well-known organic synthetic reaction under such conditions that the pulp or fiber is not damaged. For example, a dithiocarbamic acid group is introduced by aminating chlorinated polyolefin pulp or polyvinyl chloride fiber with an amine in the presence or absence of a non-solvent medium such as water, followed by reaction with carbon disulfide.

As for the amount of metallic ion collecting groups introduced, a large amount is desirable but an amount of about 0.1 to 10 meq/g is sufficient in practice. The preferred form of the filters is a water-permeable, thin layer film such as paper, woven fabric or non-woven fabric.

Formation of the water-permeable, thin layer film is carried out by well-known methods, for example, by making filter paper from pulp, by weaving fiber into filter cloth or by making non-woven fabric from pulp or fiber by a bonding agent process or fusion process.

In either case, it is important to give a moderate degree of water permeability to the thin layer film without a great reduction in its effective contact area. Further, it is preferable that the thin layer film has a strength sufficient to withstand filtration operation and has a high dimensional stability. Suitable thickness of the film is about 0.05 to 5 mm depending upon the ability to collect metallic ions and the rate of filtration required. The thickness outside the above-described range is not desirable because the film of less than 0.05 mm thick is poor in mechanical strength and the film of more than 5 mm thick has a large resistance to filtration. Suitable water permeability of the thin layer film is about 1 to about 1,000 seconds, preferably 5 to 100 seconds, in terms of a filtration time required for 1 cc of water to be filtered through the surface area of the film of 1 cm$^2$ under a water head of 10 cm.

Among the processes for making the thin layer film, the filter paper making process has most general-purpose properties. In this case, the mechanical strength and water resistance of the film can be improved by adding a bonding agent or by blending with the other kinds of pulp. Further, this process has an advantage in that water permeability is readily regulated by controlling the basis weight and thickness of filter paper.

The introduction of collecting groups into pulp or fiber may be carried out prior to or after the process for making thin layer film from pulp or fiber. However, the latter case has a disadvantage in that the formed thin layer film is easily deformed.

As described above, by the use of the present filters for the selective collection of metallic ions, it becomes possible to collect and remove rapidly and efficiently an extremely small trace amount of heavy metals contained in a solution. Consequently, the filters of the present invention are effectively applicable to removal of heavy metals and recovery of a trace amount of valuable metals from industrial waste water. The filters are in the form of filter paper or filter cloth and are simple to handle. Consequently, they are very effective for prevention of environmental pollution and for effective utilization of natural resources.

The rate of filtration in practical use is determined depending upon the intended use. When a high rate of filtration is desired, it is necessary to ensure the collection of the objective metallic ions by using a thicker filter or by placing two or more pieces of filter one upon another.

The present invention will be illustrated in more detail with reference to the following examples, but the invention is not limited to the examples. All parts and percentages in the examples are by weight unless otherwise indicated.

EXAMPLE 1

Commercially available polyvinyl chloride fiber was cut to a length of 5 L to 10 mm. A mixture of 10 parts of the cut fiber, 60 parts of ethylenediamine and 15 parts of water was reacted at 80° C for 20 hours. The reaction product was filtered, washed with water and dried. Thus, 8.1 parts of a yellowish brown, aminated polyvinyl chloride fiber (hereinafter referred to as "Fiber I") was obtained.

Next, 10 parts of the Fiber I was reacted with 25 parts of carbon disulfide at 40° C for 3 hours. The resulting product was filtered, washed with water and dried to obtain 13.1 parts of a yellowish brown fibrous product (hereinafter referred to as "Fiber II"). By the elementary analysis of the product and quantitative analysis of dithiocarbamic acid group, it was found that the product contained 18% of the group (converted to carbon disulfide basis).

Next, 10 parts of the Fiber II was blended with 10 parts of natural pulp and there was made from the mixture filter paper of 1 mm thick (hereinafter referred to as "Filter paper I") with a basis weight of 350 g/m$^2$. The water permeability (time required for 1 cc of water to be filtered through the surface area of filter paper of 1 cm$^2$ under a water head of 10 cm) of the filter paper was 15 seconds.

The Filter paper I was cut and mounted on a filter holder of 47 mm in diameter, and 100 cc of an aqueous solution containing 1 mg/l of mercury was passed through the paper over 3 minutes. Mercury in the filtrate was quantitatively determined by atomic absorption analysis but it was not detected.

EXAMPLE 2

Polyethylene pulp prepared by the solution flashing method was chlorinated to obtain chlorinated polyethylene pulp having a chlorine content of 8%.

A mixture of 10 parts of the chlorinated polyethylene pulp, 50 parts of ethylenediamine and 20 parts of water was reacted at 80° C for 15 hours. The reaction product was filtered, washed with water and dried to obtain 10.9 parts of a yellowish brown fibrous product (hereinafter referred to as "Fiber III").

Next, 10 parts of the Fiber III was reacted with carbon disulfide in the same manner as in Example 1. Thus, 12.1 parts of a yellowish brown fibrous product (hereinafter referred to as "Fiber IV") was obtained. It was found by the analysis that the fibrous product contained 9% of dithiocarbamic acid group (converted to carbon disulfide basis).

As the Fiber IV kept the form of pulp, it was converted, as it was, into filter paper of 2 mm thick (hereinafter referred to as "Filter paper II") with a basis weight of 780 g/m$^2$. The water permeability of the filter paper was 25 seconds.

The Filter paper II was mounted on a filter holder of 47 mm in diameter and 100 cc of an aqueous solution containing 1 mg/l of gold was passed through the paper over 2 minutes. The filtrate was analyzed but gold was not detected.

EXAMPLE 3

Each of the Fiber I and Fiber III was blended with 30% of natural pulp and filter paper was made from the resulting mixtures. Thus, the Filter papers III and IV were obtained, respectively.

|  | Thickness (mm) | Basis weight (g/m$^2$) |
| --- | --- | --- |
| Filter paper III | 2 | 730 |
| Filter paper IV | 5 | 1420 |

The filter papers were tested for the ability to collect metallic ions by dipping them in an aqueous solution containing 10 mg/l of a metal. As a result, the papers adsorbed mercury, gold, silver, nickel, copper, zinc, cadmium, and chromium.

What is claimed is:

1. A filter for the selective collection of metallic ions, comprising a water-permeable thin layer film made from synthetic pulp or synthetic fiber, which is pulp or fiber of a resin selected from the group consisting of polyethylene, polypropylene, polyvinyl chloride, polystyrene, polyvinyl alcohol, and novolac resins, having a concentration of metallic ion-collecting polar groups chemically linked thereto which contain an element selected from the group consisting of oxygen, nitrogen, and sulfur atoms and which selectively form a nonionic linkage together with metallic ions; said concentration being sufficient to provide said filter with a water permeability of 1 to 1000 seconds in terms of the time required for 1 cc of water to be filtered through the surface area of the film of 1 cm$^2$ under a water head of 10 cm, said filter having been prepared by reacting said synthetic pulp or synthetic fiber with a metallic ion-collecting polar group providing compound under reaction conditions such that the metallic ion-collecting polar groups are chemically linked to said synthetic pulp or synthetic fiber.

2. A filter according to claim 1, wherein the thickness of said film is 0.05 to 5 mm.

3. A filter according to claim 1, wherein the amount of said metallic ion collecting group is 0.1 to 10 meq/g.

4. A filter according to claim 1, wherein said metallic ion collecting group is selected from the group consisting of acetamino, iminodiacetato, o-aminophenol, ethylenediamino, polyethylenepolyamine, thiourea, phenylthiourea, thiosemicarbazide, thiocarbazide, dithiocarbamate, dithiocarbamic acid, resorcinol, gallic acid, dithioic acid, thiol and polythiol.

5. A filter according to claim 1, wherein said filter is in the form of paper, woven fabric or non-woven fabric.

* * * * *

UNITED STATES PATENT AND TRADEMARK OFFICE
CERTIFICATE OF CORRECTION

PATENT NO. : 4,092,250
DATED : May 30, 1978
INVENTOR(S) : Takezo SANO et al

It is certified that error appears in the above-identified patent and that said Letters Patent are hereby corrected as shown below:

After [30] Foreign Application Priority Data"
delete "December 8, 1975" and insert -- August 12, 1975 --.

Signed and Sealed this

Nineteenth Day of December 1978

[SEAL]

Attest:

RUTH C. MASON
Attesting Officer

DONALD W. BANNER
Commissioner of Patents and Trademarks